US006934389B2

(12) United States Patent
Strasser et al.

(10) Patent No.: US 6,934,389 B2
(45) Date of Patent: Aug. 23, 2005

(54) METHOD AND APPARATUS FOR PROVIDING BUS-ENCRYPTED COPY PROTECTION KEY TO AN UNSECURED BUS

(75) Inventors: David A. Strasser, North York (CA); Edwin Pang, Unionville (CA); Gabriel Z. Varga, Toronto (CA)

(73) Assignee: ATI International SRL, Christchurch (BB)

( * ) Notice: Subject to any disclaimer, the term of this patent is extended or adjusted under 35 U.S.C. 154(b) by 784 days.

(21) Appl. No.: 09/798,538

(22) Filed: Mar. 2, 2001

(65) Prior Publication Data

US 2002/0164022 A1 Nov. 7, 2002

(51) Int. Cl.[7] .............................. H04N 7/167; H04L 9/00
(52) U.S. Cl. .......................... 380/201; 380/44; 380/277
(58) Field of Search ................................ 380/200, 201, 380/277, 29, 44, 46, 280–282, 284–285, 212, 28, 262, 257, 186; 713/165, 171, 189, 200; 705/50, 57

(56) References Cited

U.S. PATENT DOCUMENTS

| 5,796,836 | A | * | 8/1998 | Markham | ..................... 380/28 |
| 6,052,466 | A | * | 4/2000 | Wright | ........................ 380/262 |
| 6,061,791 | A | * | 5/2000 | Moreau | ....................... 713/171 |
| 6,236,727 | B1 | * | 5/2001 | Ciacelli et al. | ............. 380/212 |
| 6,249,585 | B1 | * | 6/2001 | McGrew et al. | ............ 380/286 |
| 6,266,418 | B1 | * | 7/2001 | Carter et al. | ................ 380/257 |

OTHER PUBLICATIONS

Secure Hash Standard, FIPS PUB 180–1, Federal Information Processing Standards Publication, U.S. Department of Commerce, Technology Administration, National Institute of Standards and Technology, Apr. 17, 1995 (18 pages).

OpenCable™ POD Copy Protection System, IS–POD–CP–INT03–000714 Interim Specification, Jul. 14, 2000 (79 pages).

* cited by examiner

Primary Examiner—Hosuk Song
(74) Attorney, Agent, or Firm—Vedder, Price, Kaufman Kammholz, P.C.

(57) ABSTRACT

A copy protection (CP) key used by a sending source, such as a POD, to encrypt content such as audio and/or video information is derived by a first key generator associated with a first processor and is locally encrypted by the first processor using a locally generated bus encryption key to produce a bus encrypted CP key that is sent over a local unsecure bus to a second processor, such as a graphics processor. The second processor decrypts the bus encrypted copy key using a decryption engine to obtain the CP key. The second processor receives the encrypted content and in one embodiment, also uses the same decryption engine to decrypt the encrypted content. The first and second processors locally exchange public keys to each locally derive a bus encryption key used to encrypt the CP key before it is sent over the unsecure bus and decrypt the encrypted CP key after it is sent over the bus. The locally exchanged public keys are shorter in length than those used between the CPU and POD to produce the original CP key.

18 Claims, 4 Drawing Sheets

METHOD AND APPARATUS FOR PROVIDING BUS-ENCRYPTED COPY PROTECTION KEY TO AN UNSECURED BUS

FIELD OF THE INVENTION

The invention relates generally to video protection methods and apparatus and more particularly to methods and apparatus for providing a bus-encrypted copy protection (CP) key to an unsecured bus.

BACKGROUND OF THE INVENTION

Video content, including still photography, motion photography, and multimedia content, is frequently the result of extensive intellectual investment. For example, feature motion pictures often cost millions of dollars to produce. Software developers, such as manufacturers of video games, often spend vast sums of money researching and developing images with a particular appearance. Such expenditures can easily represent a substantial portion of the producer's investment in the video content. Accordingly, unlicensed reproduction of video content is a threat to the pocketbook of the producers of the video content.

While many countries have enacted legislation to curb the unlicensed reproduction of video content, "bootleggers" abound. Bootleg copies of major motion pictures and other video content can be found advertised in magazines and on the Internet, for example. Since video content has traditionally been distributed in analog format (i.e., video tape and cable television), the quality of such bootleg copies has been notoriously poor, due to the technical difficulties bootleggers find in copying analog video content. However, as the distribution of video content has migrated from analog to digital technologies, and as digital technology has improved, the quality of such copies has likewise improved. Bootleggers are able to download real time video content directly as the video content is distributed on digital cable networks, digital satellite systems, or as streaming video over the Internet. The result of such bootlegging is a much higher quality product, for which more money can be illegally obtained, and which finds a much broader market. The growth of digital distribution techniques has, therefore, made the illegal bootlegging of video content more lucrative.

Due to the threat posed by bootleggers, legitimate distributors of video content have resorted to encryption. Encryption allows video content to be distributed in a manner that only authorized recipients can decrypt. Bootleggers may be able to download the encrypted video content, but such encrypted video is useless without the proper decryption key that is used to decrypt the video content. Encryption is made possible by the exchange of an encryption key ("key") that is shared between the distributor and the intended recipient, which is difficult or impossible for the bootlegger to determine or to guess. Possession of the key enables a recipient of the video content to decrypt and view (and record) the encrypted video content.

Of course, many bootleggers are able to mount a "brute force" attack. A brute force attack involves attempting to decrypt the encrypted video content using every conceivable encryption key until the correct encryption key is identified. While theoretically any key can be determined by a brute force attack, a brute force attack can take a large amount of time. Theoretical estimates of the amount of time required to perform a brute force attack can be made using various types of hardware and software.

One of the best defenses against a brute force attack is to change the key. It is particularly helpful to use each key so briefly that the key cannot be cracked before the next key is used. For this reason, different portions of the video content may be encrypted by a video content provider using different encryption keys. For example, the video content may be partitioned into segments such that each segment represents two seconds of video content, and each segment may be encrypted using a different key. Due to the extremely large number of keys that are therefore involved and the time required to crack each key, a brute force crack is prohibitively difficult. One such technology is described in the Open Cable POD Copy Protection System (IS-POD-CP-INT03-000714) Interim Specification dated Jul. 14, 2000 incorporated herein by reference. Generally, a Diffie Hellman public key exchange takes place between a POD and a host unit (e.g., CPU). The resulting long term public keys (e.g., 1024-bit keys) are used to derive authentication keys by applying the SHA-1 (secure hash algorithm) function to a message consisting of a shared secret key, a host ID, a POD ID and the long term public keys. The SHA-1 operates according to the methodology described in the U.S. Department of Commerce, National Institute of Standards and Technology, Federal Information Processing Standards Publication 180-1 (NIST FIPS PUB 180-1). The host and POD also exchange random values and respective ID's to compute an interim shared message digest. The interim shared message digest is computed by applying SHA-1 to a message consisting of the authentication key, the secret portion of the Diffie Hellman key and the two random values. The interim shared message digest is used as input to a DFAST (Dynamic Feedback Arrangement Scrambling Technique) engine that operates according to the methodology described in U.S. Pat. No. 4,860,353. The DFAST engine uses the interim shared message digest to produce a 56-bit copy protection (CP) key. A new CP key may be generated every two seconds or other suitable period as determined by the POD. Both the POD and the host internally determine the CP key. The CP key is not sent between the POD and host. Also, such techniques typically use the hash operation and DFAST algorithm when producing the shared secret key, such as the CP key. This results in extra processing time.

It would be desirable to off load some or all of the decryption from the CPU to another processor where multiple processors are used in a host unit. For example, a graphics processor or other suitable processor may be locally coupled to the host CPU through an unsecure bus such as a PCI bus or non-peripheral device bus. Typically, if a new encryption (CP) key is used by the distributor, the new key is also derived by the central processing unit. Because the central processing unit is typically coupled to the graphics chip across an unsecured bus, which is easily accessible to other devices in the recipient system, a bootlegger may simply intercept the keys as they are provided to the graphics processor and use the keys to decrypt the video content.

Therefore, a need has arisen for a method and apparatus that provides for a bus encrypted CP key within a recipient unit.

DETAILED DESCRIPTION OF A PREFERRED EMBODIMENT OF THE INVENTION

Briefly, a copy protection (CP) key used by a sending source, such as a POD, to encrypt content such as audio and/or video information derived by a first key generator associated with a first processor and is locally encrypted by the first processor using a locally generated bus encryption key to produce a bus encrypted CP key that is sent over a local unsecure bus to a second processor, such as a graphics processor. The second processor decrypts the bus encrypted copy key using a decryption engine to obtain the CP key. The second processor receives the encrypted content and in one embodiment, also uses the same decryption engine to decrypt the encrypted content. The first and second processors locally exchange public keys to each locally derive a bus encryption key used to encrypt the CP key before it is sent over the unsecure bus and decrypt the encrypted CP key after it is sent over the bus. The locally exchanged public keys are shorter in length than those used between the CPU and POD to produce the original CP key.

Figure 1:
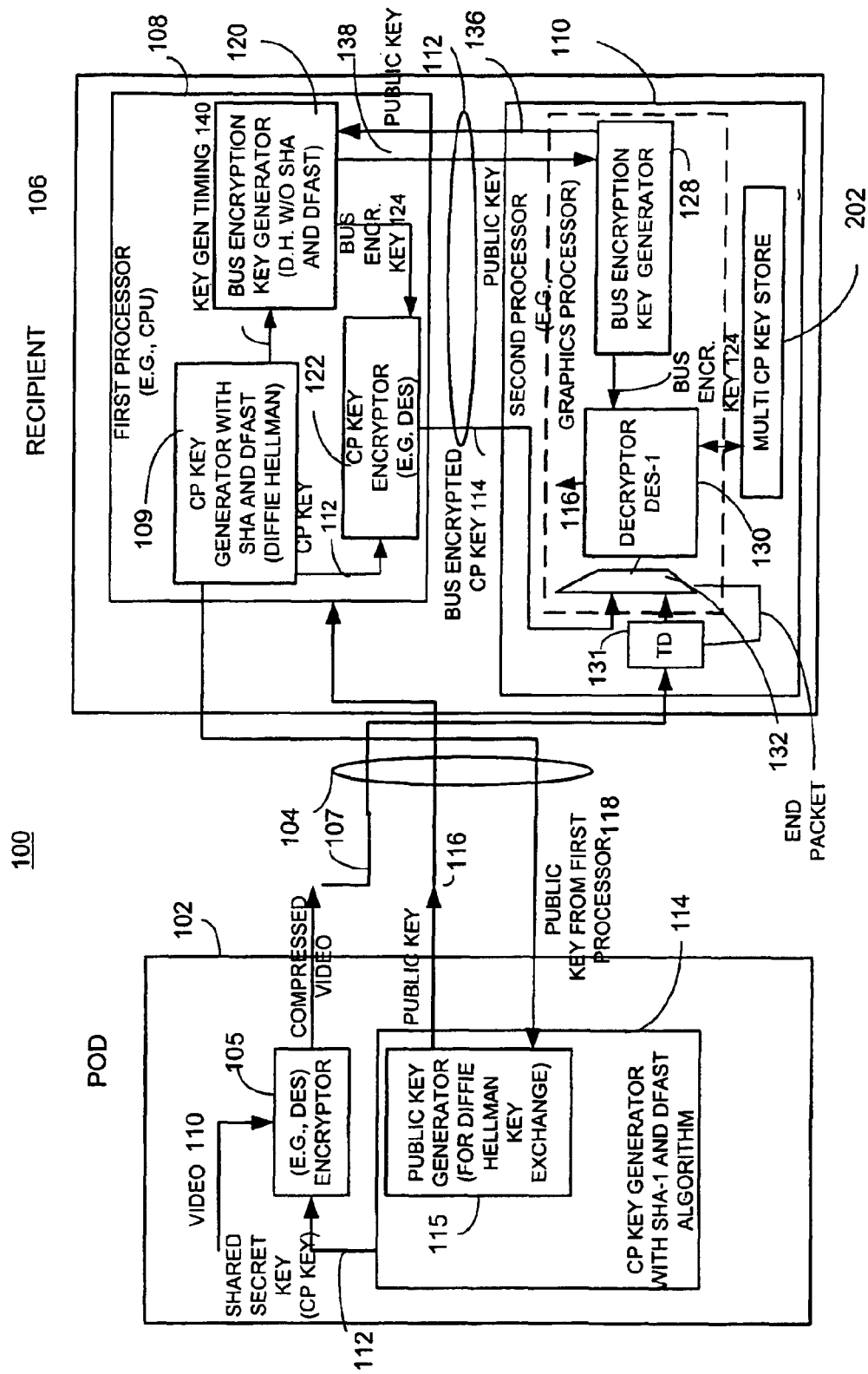
FIG. 1 illustrates a content distribution system in accordance with one embodiment of the invention.

FIG. 1 shows a content distribution system 100 in accordance with one embodiment of the present invention. The content distribution system 106 includes a POD module (point of deployment) 102, a distribution channel 104 such as a coaxial cable or a satellite communication channel, and a recipient unit such as an HDTV (high definition television) 106 set top box or other unit. The HDTV 106 contains a first processor such as a CPU (central processing unit) 108 and a second processor such as a graphics chip 110. The second processor 110 is coupled to the distribution channel 104 to receive compressed video, audio or other data 107. The first processor 108 is coupled to the POD to receive and send public keys and other cryptographic related data used to create the CP key. The CPU 108 is coupled to the graphics chip 110 via an unsecured bus 112 such as a PCI (peripheral component interconnect) bus or other suitable bus.

The POD (point of deployment) module 102 is a system that distributes encrypted compressed video content 107 via the distribution channel 104. As known in the art, the POD uses an encryptor 105 such as a DES (data encryption standard) cipher algorithm and a copy protection (CP) key 112, a 56-bit DES key to encrypt compressed video content 110 to produce encrypted compressed video content. A symmetric cipher algorithm such as DES is used since such schemes are typically faster than two-key public key encryption. The DES encryption key is a shared secret key, used for both encryption and decryption.

The CP key 112 is itself extremely valuable to malicious eavesdroppers, who can use the DES key to create additional copies of the compressed video information. Because the DES key is so valuable, and to improve security, the DES key is changed (i.e., "refreshed") periodically. For example, the DES key is refreshed every two seconds.

The POD 112 provides the encrypted compressed video content 107 to the distribution channel 104. The distribution channel 104 is an open channel, meaning that the channel may be examined by the malicious eavesdropper. However, because the compressed video content 107 on the channel is encrypted, the malicious eavesdropper must attempt decryption to obtain the compressed video content. It is generally understood that most encryption algorithms may eventually be attacked and an encryption key can be determined by a brute force attack, particularly keys that are of limited length. For this reason the CP key 112 (56-bit DES key) is changed (i.e., "refreshed") every two seconds. While any particular 56-bit DES key may be found by a brute force attack, it is assumed that such an attack would require the malicious eavesdropper to spend more than two seconds of computing time. Therefore, because the 56-bit DES key is changed every two seconds, it may be assumed that the 56-bit DES key cannot be guessed by a brute force attack.

Of course, the CP key is nevertheless vulnerable to attack by anyone who has access to the kernel of the POD's pseudorandom number generator 114. However, it is assumed that the POD's pseudorandom number generator is hardened against intrusion.

The graphics processor 110 of the HDTV 106 receives the encrypted compressed video content 107 from the distribution channel 104. The graphics processor 110, when provided with a bus encrypted CP key, decrypts the encrypted compressed video content 107 to provide the decompressed video content 116. However, because the CP key is changed by the POD every two seconds, the graphics processor 110 does not decrypt the encrypted compressed video content until the graphics processor 110 obtains an encrypted version of the CP key from the CPU 108 as the bus encrypted CP key.

In accordance with one embodiment of the present invention, the CPU 108 self generates the CP key (56-bit DES key) from the POD when the CP key 112 (56-bit DES key) is refreshed, and provides an encrypted version of the CP key (56-bit DES key) to the graphics processor as the bus encrypted CP key 114. As known in the art, the POD module initiates generation of a new CP key with the first processor 108. Receiving the encrypted 56-bit DES key includes, in accordance with one embodiment of the present invention, encrypting the CP key using an encryption scheme such as DES cipher algorithm or other suitable technique. Specifically, in accordance with one embodiment of the present invention, the CP key is itself encrypted and decrypted using a shared secret key, referred to herein as the bus encryption key derived from public keys through a Diffie Hellman type key exchange.

One of the most important features of any encryption scheme is the level of security it provides. One measure of the security provided by an encryption scheme is a statistical measure of processor time that would be required to succeed in attacking the encryption scheme. Generally, keys that have a greater key length are more secure, since a successful attack on encryption schemes having a greater key length requires more processor time than a successful attack on encryption schemes having a lesser key length. Keys that are only a few bits in length are not generally considered secure. Specifically, keys that may be successfully attacked in only a few minutes of processor time are not generally considered secure.

However, in accordance with one embodiment of the present invention, public/private keys that are shorter in length than those used to originally generate the CP key provide greater security than might be expected, since the keys are changed every few seconds. Even keys that may be successfully attacked in only a few minutes of processor time may be regarded as secure, since the key is refreshed so often. For example, a first public key exchange scheme to generate the CP key (i.e., the public key encryption scheme between the POD and the CPU) can provide adequate security with 64 bits of key length. Similarly, a second public key exchange scheme to generate a bus encryption key (i.e., the public key exchange scheme between the CPU and the graphics processor) can provide adequate security with 56 bits of public/private key length. Traditionally, a key length of only 56 bits might not be considered adequate to encrypt highly valuable content such as a movie.

Of course, if the malicious eavesdropper were successful in attacking at least one of the key exchanges, then the malicious eavesdropper could more simply derive the CP key and then obtain the compressed video content. Accordingly, the malicious eavesdropper must attack at least one of the public key encryption schemes to get the 56-bit key and then use the 56-bit key to obtain the compressed video content, or else attack the 56-bit key directly to obtain the compressed video content. Moreover, the malicious eavesdropper must be successful within only two seconds.

Because the various public keys are refreshed every two seconds or after some other brief period of time, the public keys are sufficiently secure if they cannot be successfully attacked within only two seconds. Specifically, keys that may be successfully attacked in only a few minutes of processor time may now be considered secure if the processor time required to attack the keys is greater than two seconds.

It will also be understood that, although the various embodiments of the present invention are described in terms of compressed video information, such compression includes uncompressed or partially-compressed video information that may be substituted for fully compressed video information. Also, it will be understood that the video information includes graphics information, JPEG (Joint Picture Expert Group) images, MPEG (Motion Picture Expert Group) or MPEG-2 images, other streaming video information, etc.

The POD 102 includes a CP key-generator 114 that includes a public key generator 115 that generates a public key 116, such as a 1024-bit public key to be exchanged with a public key generated by the recipient such as an HDTV 106 to derive the shared secret key, namely the CP key 112 using the Diffie Hellman key exchange technique and the SHA-1 and DFAST hash algorithms as known in the art. The CP key generator 114 may be of the type, for example, used in the Open Cable POD Copy Protection System Interim Specification that employs as part of the cryptographic functions, deriving a new CP key based on a long term authentication key, exchanged random numbers and the shared secret key, such as a Diffie Hellman key. The public key generator 115 generates the public keys 116 and the authentication key. In addition, the public key generator also outputs random numbers used to refresh the CP key which may be, for example, 64-bit random numbers. The SHA-1 function is first used to compress the long term keys such as the authentication key and the shared secret key, such as a Diffie Hellman key, and the random numbers. The CP key is derived using the DFAST algorithm. The CP key 112 is applied to an encryptor 105, such as a DES encryptor, to encrypt the video content 110 and provide the compressed video content 107 to the transport demultiplexer 131.

The CPU 108 computes its SHA-1 message digest based on the public key 116 and a shared secret key, such as a Diffie Hellman key, and random numbers exchanged in a key generation process, as known in the art. The SHA-1 algorithm is used as a cryptographic compression function to generate a message digest with the proper length for a DFAST engine. These operations are performed by the CP key generator 109 to internally derive the CP key 112. Accordingly, the CPU 108 computes the CP key 112 also based on long term keys and exchanged random numbers using the SHA-1 hash function and the DFAST algorithm as described, for example, in the Open Cable POD Copy Protection System Interim Specification.

The CPU 108 also includes a bus encryption key generator 120 and a CP key encryptor 122. The bus encryption key generator 120, which may be, for example, a software algorithm and/or hardware, if desired, generates a third secret key using a Diffie Hellman-type key generation approach to generate a bus encryption key 124 (e.g. a shared secret bus encryption key). The CP key encryptor 122 may be, for example, a software algorithm or cryptographic engine that provides DES encryption and encrypts the CP key 112 using the bus encryption key 124 and a symmetric encryption algorithm such as DES to produce the bus encrypted CP key 114 which is communicated over unsecure bus 112 to the second processor, such as the graphics processor 110. Unlike the CP key generator 114, the bus encryption key generator 120 does not employ the SHA-1 hash algorithm and does not employ the DFAST algorithm, thus reducing processing requirements. Accordingly, the bus encryption key 124 is generated without using a one-way function, such as the SHA-1 function, that is used to generate the CP key 112. The CPU 108 provides the bus encrypted CP key 114 to the unsecured bus 112 for decryption by the second processor 110.

The second processor may include an integrated circuit that includes a decryption module 126 that includes a bus encryption key generator 128 and a decryptor 130. The bus encryption key generator 128 is the same type of generator as the bus encryption key generator 120 and hence both locally generate a shared secret key, namely the bus encryption key 124, so that the bus encryption key is not communicated over any communication link such as the unsecured bus 112 or the channel 104 between the POD and the recipient. The decryptor 130 is operatively responsive to the bus encrypted CP key 114 by decrypting the bus encrypted CP key. The decryptor 130 includes a first selector 132 that is operative to select between the transport stream payload, such as the compressed video content 107, and the bus encrypted CP key 114. The selector 132 may be, for example, a hardware or software multiplexing operation which is operatively coupled to receive the bus encrypted CP key 114 from the unsecured bus 112 and also operatively coupled to receive compressed video content 107 from the transport stream. The decryptor 130 decrypts selective encrypted packets based on a decrypted bus encrypted CP key. The decryptor 130 also decrypts the bus encrypted CP key 114 based upon the bus encrypted key 124 generated by the local bus encryption key generator 128. The resulting unencrypted CP key is stored in a memory element 202, such as a register or other suitable memory that stores the resulting CP key indicated as 134. The memory element 202 preferably stores a plurality of decrypted CP keys.

The decryptor 130 controls the selector 132 and selector 304 to switch selection in response to the end of a packet in the transport stream wherein the packet has a header, a payload and wherein the payload is encrypted using the CP key 112 and a DES algorithm, such as in encryptor 105. The second processor includes an input port, which may be any suitable interface, to couple to the unsecure bus 112. In operation, when an end of packet is detected (e.g., by a transport demultiplexer) and when a new bus encrypted CP key is pending (e.g., sent over the unsecure bus but not yet decrypted), the selectors 132 and 304 are selected by the control logic to decrypt the bus encrypted CP key. Otherwise, the selectors are selected to allow decryption of an encrypted payload from the transport demux.

The bus encryption key generator 128 generates the bus encryption key 124 without the SHA-1 algorithm and without the DFAST algorithm. The bus encryption key generator 128 (and hence bus encryption key generator 120) may operate as conventional Diffie Hellman cryptographic engines. For example, the bus encryption key generator 128 includes a public key generator that generates a public key based upon a random number from a random number generator. The resulting public key 136 is passed across the unsecured bus 112 for the bus encryption key generator 120. The bus encryption key generator 128 also includes a public key receiver that receives a public key 138 from the unsecured bus as generated by the bus encryption key generator 120 associated with the CPU 108. The bus encryption key generator 128 also generates the bus encryption key 124 based upon the random number and the received public key 138. The length of the bus encryption key 124 matches the length of the first and second public keys.

Figure 2:
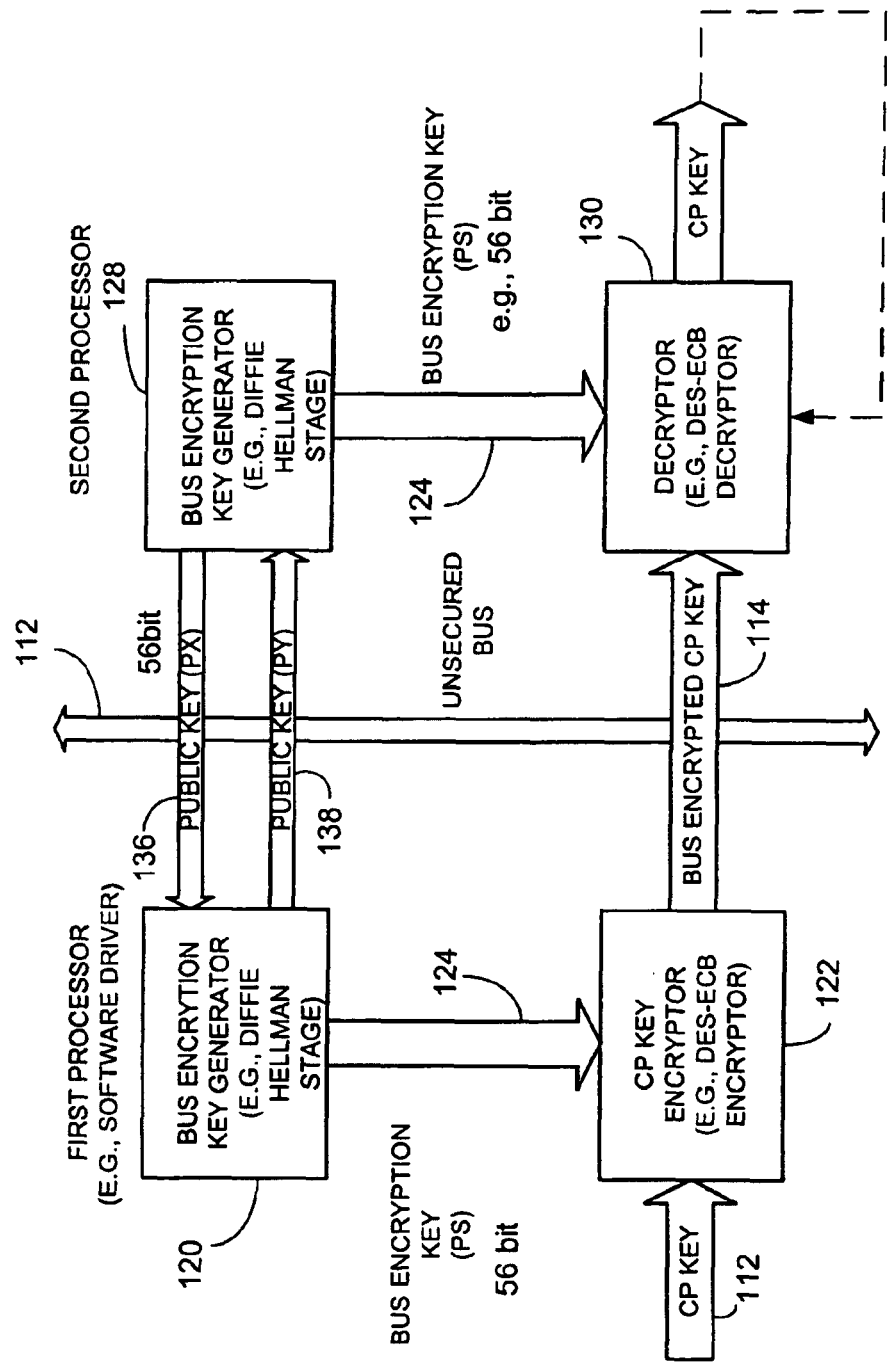
FIG. 2 is a block diagram illustrating one example of an apparatus for providing a bus encrypted CP key in accordance with one embodiment of the invention.

Referring also to FIG. 2, the decryptor 130 does, for example, DES decryption of the transport stream from the POD module. The bus encryption key generator 128 generates, for example, a 56-bit bus encryption key (a shared secret key) through the action of selecting random numbers and then calculating and exchanging public keys based on the random numbers. This may be done, for example, via a Diffie Hellman key exchange and key generation technique as known in the art. Once the bus encryption key is derived locally by both the first processor and the second processor, the first processor encrypts the CP key using the bus encryption key. When, for example, the second processor seesaw end of packet indication, the bus encrypted CP key is sent to the decryptor 130 for decryption using a locally generated bus encryption key 124 as generated by the bus encryption key generator 128. The resulting unencrypted CP key is then stored in a register that is not accessible by the first processor, such as in the multiple CP key storage 202.

Each of the bus encryption key generators 128 and 120 calculate or generate the bus encryption key locally. This may be done using, for example, a Diffie Hellman algorithm as described, for example, in U.S. Pat. No. 4,200,770. The following Table 1 indicates, for example, the operations carried out by each of the bus encryption key generators.

TABLE 1

| Software Driver on First Processor | Second Processor |
|---|---|
| 1. Select a random value y;<br>2. Calculate $P_y = g^y \bmod p$;<br>3. Send $P_y$ to second processor<br>4. Generate bus encryption key ($P_s$) such that $P_s = P_x^y \bmod p$ | 1. Select a random value x<br>2. Calculate $P_x = g^x \bmod p$;<br>3. Send $P_x$ to first processor<br>4. Generate bus encryption key ($P_s$) such that $P_s = P_y^x \bmod p$ |

Where Py and Px are public keys 138 and 136 respectively and Ps is the bus encryption key 124. Accordingly, to generate the bus encryption key 124, a software driver 120 (and/or dedicated hardware, if desired), controls the first processor to act as the bus encryption key generator 120 (and/or dedicated hardware, if desired) Hence, the first processor selects an independent random value y. The bus encryption key generator 120 obtains public constants g and p. The bus encryption key generator 120 then generates the public key 138 for exchange with the other bus encryption key generator 136. The hardware (or software) bus encryption key generator 128 locally carries out the same operations to exchange public keys. Each bus encryption key generator 128 and 120 then locally generates the shared key ($P_s$), namely the bus encryption key 124.

The decryption module 130, in a preferred embodiment, is structured as a pipelined DES decryption engine such that a first stage iterates eight times to generate an intermediate value that is passed to a second stage. The second stage completes eight more iterations on the intermediate value to obtain the decrypted value. In this manner, one stage of the decryption module can be used to start decryption on a bus encryption key while the second stage finishes decryption of a transport payload, or vice versa.

Figure 3:
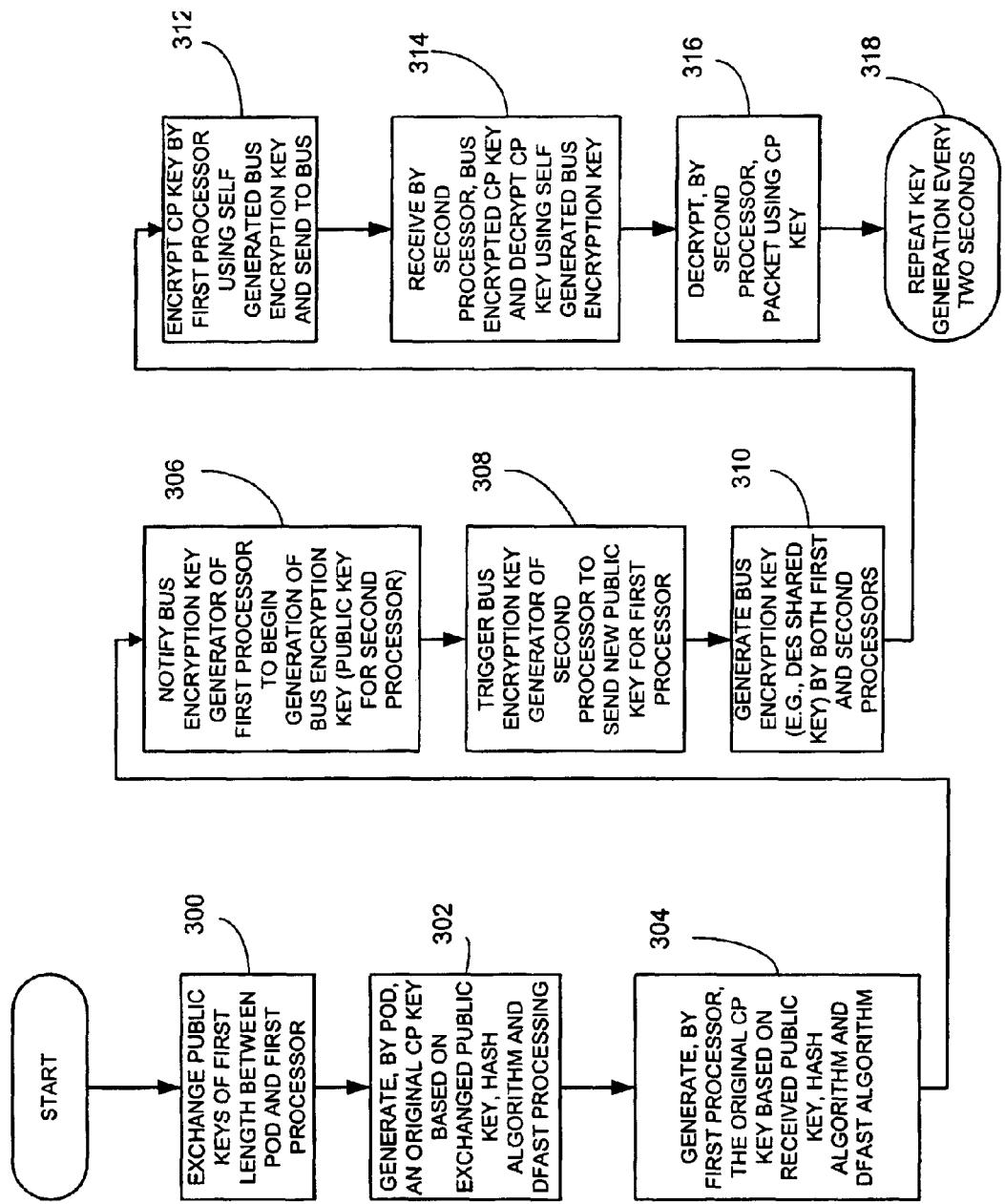
FIG. 3 is a flow chart illustrating one example of a method for providing a bus encrypted CP key in accordance with one embodiment of the invention.

FIG. 3 is a flow chart illustrating a method for providing a bus encrypted CP key to an unsecured bus in accordance with one embodiment of the invention. As shown in block 300, the method includes exchanging, for example, public keys (and/or random numbers) of a first length between a POD and a first processor. This may be done, for example, to generate the CP key. As shown in block 302, the method includes generating, by the POD, the original CP key based on the exchanged public keys, the hash algorithms (SHA-1 and the DFAST algorithm) as described, for example, in the Open Cable POD Specification. As shown in block 304, the method includes generating by the first processor, the original CP key based on the received public key, a hash algorithm such as the SHA-1 algorithm, and the DFAST algorithm. Accordingly, both the first processor and the POD each locally generate the CP key. As shown in block 306, the method includes a software driver or hardware based interrupt or any other suitable mechanism to provide key generation timing data 140 to the bus encryption key generator 120 to indicate that the first processor should generate the public key 138 for the second processor to generate the bus encryption key 124. The key generation timing data 140 may be, for example, generated when the POD notifies the first processor that a new CP key is to be generated which may occur, for example, every two seconds. In this manner a new bus encryption key 124 is also generated when a new CP key is generated.

As shown in block 308, the method includes triggering the bus encryption key generator 128 of the second processor to send the new public key 136 for the first processor. This may be done, for example, when the bus encryption key generator 128 receives a public key over the unsecure bus from the bus encryption key generator. As shown in block 310, the method includes locally self-generating the bus encryption key 124 by both the first and second processors. This may be done simultaneously or sequentially, if desired.

As shown in block 312, the method includes encrypting, by the first processor using, for example, the CP key encryptor 122, the CP key, using the self-generated bus encryption key 124. Once the bus encrypted CP key 114 is generated, the first processor sends it over the unsecure bus 112 to the second processor. As shown in block 314, the method includes receiving, by the second processor, the bus encrypted CP key 114 and decrypting the CP key using the self-generated bus encryption key 124 produced by the bus encryption key generator 128. This is shown in block 316. As shown in block 318, the process is repeated, for example, every two seconds, so that a new bus encrypted CP key is generated to encrypt each new CP key.

The exchanging of the public keys 136 and 138 between the first processor and second processor includes the exchange of public keys that are shorter in length than the public keys 116 and 118 used to generate the original CP key. This can reduce the processing time required for generating the bus encryption 124 and the bus encrypted CP key 114.

The method also includes repeatedly generating a new CP key by, for example, the first processor in response to a triggering by the POD. In response to generating a new CP key, the first processor generates a new bus encryption key 124. The first processor then encrypts the new CP key using the new bus encryption key and, for example, the CP key encryptor 122 that may be structured as a data encryption standard encryption algorithm to produce the new bus encrypted CP key.

Since the bus encryption key is a shared secret key based on the Diffie-Hellman approach using public keys that are exchanged between the first processor and the second processor, the method for providing the bus encrypted CP key includes, generating a random number (x and y) by each of the bus encryption key generators and generating a public key based on the random numbers. The method would also include passing the public keys across the unsecured bus and receiving the respective public keys from the other bus encryption key generator and then generating a same encryption key locally based on the random number and the received public key.

Figure 4:
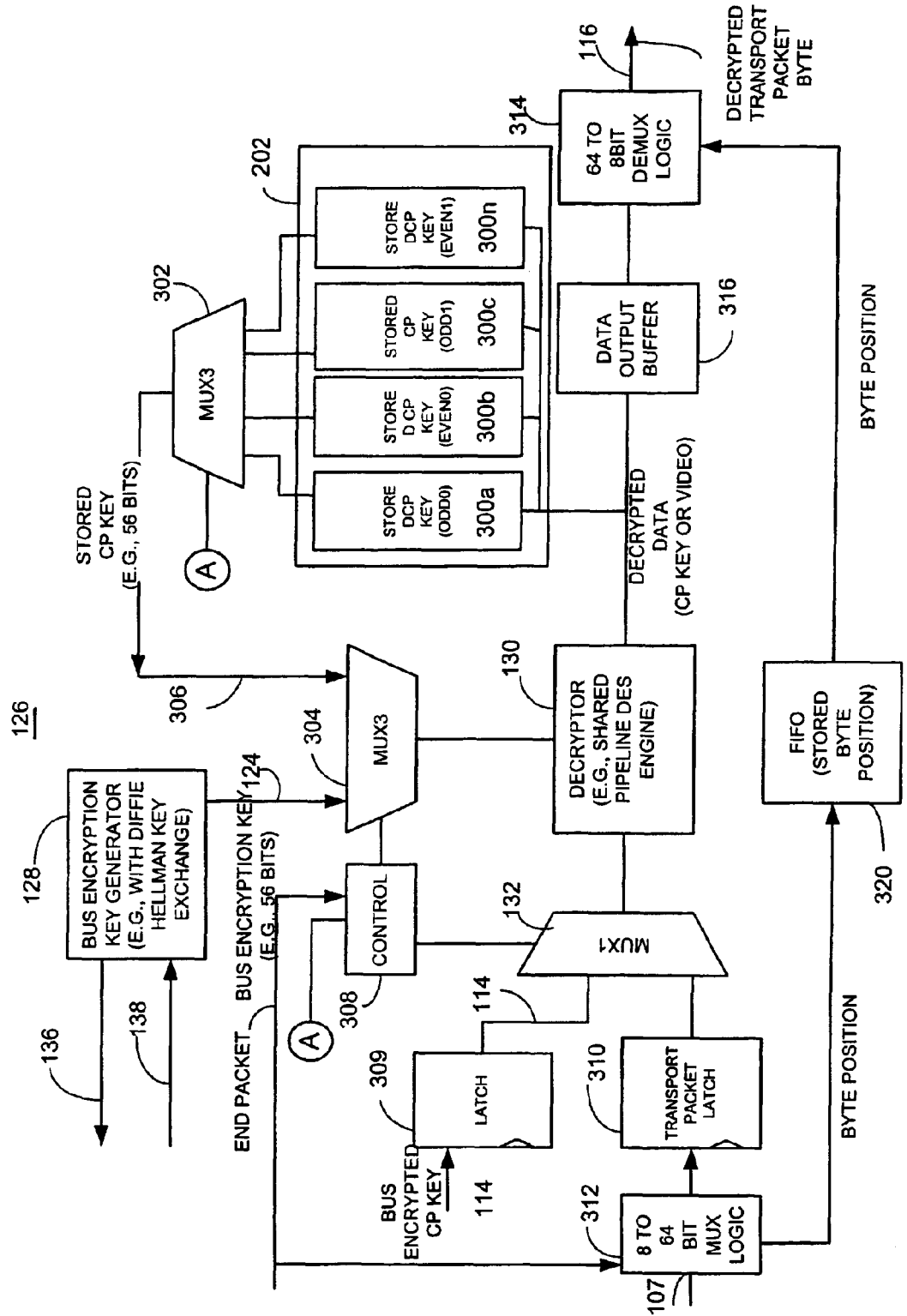
FIG. 4 is a block diagram illustrating one example of a decryption module in accordance with one embodiment of the invention.

FIG. 4 illustrates one example of the decryption module 126 showing the multiple CP key memory 202 that contains a plurality of decrypted CP keys 300a–300n, and a selector 302, such as a multiplexer operatively coupled to select one of the plurality of decrypted CP keys 300a–300n from the multiple CP key memory element 202. Another selector 304 is operatively coupled to select between a bus encryption key from the bus encryption key generator 128 or a selected decrypted CP key 306 output from the selector 302. Control logic 308 provides control of the selectors 132, 302 and 304. The decryption module 126 also includes a bus encrypted CP key latch 308, a transport packet latch 310, an 8–64 bit multiplexing stage 312, a 64–8 bit demultiplexing stage 314, a decrypted data output buffer 316, and a FIFO 320. The bus encryption key generator 128 is used for calculating (generating) locally, the shared secret key, namely the bus encryption key 124. The decryptor 130 is used to both decrypt transport packet payloads received from the transport packet latch 310 through selector 132, and also to decrypt bus encrypted keys 114 through latch 308 selected through selector 132. Accordingly, a common decryptor 130 is used to both decrypt the bus encrypted CP key to produce a decrypted CP key that are then stored as stored CP keys 300a–300n and also performs an inverse DES operation to decrypt encrypted transport packet payloads which are output to the data output buffer 316 and subsequently to the 64–8 bit demuxing local stage 312 for output as decrypted transport packet bytes as decrypted video 116. The control logic 308 controls the selecting logic to select an appropriate stored CP key when the decryptor 130 receives an encrypted transport packet payload via selector 132. This is based, for example, on a packet identifier in the header and scramble control information in the header which indicates which CP key (e.g., odd or even) to use. Alternatively, the control logic 308 controls the selector 304 to select a generated bus encryption key 124 when the decryptor 130 is used to decrypt a received bus encrypted CP key 114 via selector 132. The general order of data flow is to exchange the public keys or any other information necessary to generate the bus encryption key locally by both the first processor and the second processor, decrypt in this example, four bus encrypted CP keys and decrypt the transport stream data using the four unencrypted CP keys. Periodically, the POD will be instructed to refresh the CP keys. The software driver running on the first processor is instructed that the CP key is refreshed and prior to sending the refreshed CP key to the second processor, the software driver reinitiates the bus encryption key generator 128 to generate a new bus encryption key by triggering the exchange of public keys 136 and 138 with the bus encryption key generator associated with the other processor over the unsecured bus 112.

In operation, selector 132 selects the bus encryption key 114 from latch 309. The control logic 308 controls the selector 304 to select the bus encryption key 124 as locally generated by the bus encryption key generator 128. The decryptor 130, which is a shared inverse DES engine, decrypts the bus encrypted CP key using the bus encryption key which is then stored in the CP key register as such a CP key 300. As known in the art, two CP keys (even and odd) are used to allow continuous encryption of the transport stream. One key is used while another is being generated so both are stored for use in decryption and the scramble information indicates when to switch from one to the other. Once the appropriate CP keys have been obtained from bus encrypted CP key data that is sent by the first processor, the control logic then controls the selector 132 to select a transport packet from the transport packet latch 310. The control logic 308 then selects the appropriate stored CP key using selector 302 to select the appropriate stored CP key from the multi-CP key storage element 202. The control logic 308 then controls selector 304 to output the CP key to the decryptor 130. The decryptor 130 then performs an inverse DES operation, as known in the art, and decrypts the encrypted transport packet to produce decrypted data that is output to the data output buffer 316.

In this example, the DES engine operates on 64 bit words and the transport stream contains 8 bit words. Therefore, mux 312, demux 314 are used to provide the requisite word sizes. The FIFO 320 is used to assist when the payload is a non-multiple of 8 bits. The FIFO 320 controls the demux 314 to notify the demux how many bytes to send out.

A transport demulitplexer 131, as known in the art, removes header information from the payload and pass the scrambling information to the control logic 308 and the payload to the mux 312. The scrambling control information allows selection of the proper stored CP key. Each transport packet may include, for example, a header which may be unencrypted, an adaptation field, which may be unencrypted, and a payload which may be encrypted. However, any suitable structure may be used. There are bits in the header that indicate whether the transport stream is encrypted. At the end or beginning of each packet, the decryption module switches to key decrypt mode in response to detecting bit(s) indicating that a packet is encrypted.

As stated previously, because the encryption keys are refreshed so often, the number of encryption keys that are used in a 30-minute time period, or in a two-hour time period, is quite large. Attacking each of these encryption keys would require an enormous amount of time—the time required to attack each of the encryption keys must be multiplied by the number of encryption keys that are used. The refreshing of the bus encryption keys provides additional security beyond the security of the encryption scheme itself.

In an alternative embodiment, a simple public/private key encryption scheme may be used instead of using a shared secret key. For example, the public key 136 may be used by the first processor as a bus encryption key to encrypt the CP key. The corresponding private key stored by the second processor may be used to decrypt the bus encrypted CP key. As such, in accordance with another embodiment of the present invention, the decryption module performs decryption using a graphics chip private key. In accordance with yet another embodiment of the present invention, the decipher module determines whether a graphics chip DES key exists, performs decryption using a graphics chip DES key when the graphics chip DES key exists, and performs decryption using a graphics chip private key when the graphics chip DES key does not exist. This determination is made by reading each of a DES key register and a private key register to determine which mode is used.

The above process has many advantages. For example, unlike the Open Cable POD CP scheme, the above process avoids the use of a hash operation (e.g., SHA-1) or DFAST operation as described for example in the Open Cable POD Copy Protection System specification. Hence, the shared key exchanged over the bus between the processor and the graphics processor is generated independent of the one way hash function used by the information sender to generate the CP key. Moreover, to reduce circuitry and processing, a common decryptor is used to both decrypt the bus encrypted CP key and encrypted payload.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for providing a bus-encrypted copy protection (CP) key to an unsecured bus, the method comprising steps of:

exchanging, between a first processor and a second processor, public keys that are shorter in length than public keys used to originally generate a copy protection (CP) key, over the unsecured bus;

generating a bus encryption key by each of the first and second processors the bus encryption key having a first length;

generating, by the first processor, the CP key;

encrypting, by the first processor, the CP key using the bus encryption key and a symmetric encryption algorithm to produce a bus-encrypted CP key; and providing the bus-encrypted CP key to the unsecured bus for the second processor.

2. The method of claim 1 including the step of generating the bus encryption key without using a one way function used to generate the CP key.

3. The method of claim 2, further comprising:

repeatedly generating a new CP key;

in response to generating the new CP key, generating a new bus encryption key;

encrypting the new CP key using the new bus encryption key and the Data Encryption Standard (DES) encryption algorithm to produce a new bus-encrypted CP key;

providing the new bus-encrypted CP key to the unsecured bus for the second processor.

4. The method of claim 1, wherein the step of exchanging public keys to develop a bus encryption key includes:

generating a random number;

generating a first public key based upon the random number;

passing, the first public key across the unsecured bus;

receiving a second public key from the unsecured bus; and generating a bus encryption key based upon the random number and the second public key.

5. The method of claim 4, wherein the length of the bus encryption key matches a length of a DES algorithm key length.

6. The method of claim 5, wherein the bus encryption key is generated using a Diffie Hellman algorithm.

7. An integrated circuit adapted to receive a transport stream having a plurality of encrypted packets that have been encrypted using a copy protection key (CP) and having a port to couple to an unsecure bus, the integrated circuit comprising:

a decryption module including:

a bus encryption key generator operative to produce a bus encryption key based on a secret key shared between a first processor and a second processor; and a decryptor operatively responsive to a bus-encrypted CP key and having a first selector operative to select between the transport stream and the bus-encrypted copy protection key, and operative to decrypt selected encrypted packets based on a decrypted bus-encrypted CP key.

8. The integrated circuit of claim 7, wherein the decryptor switches selection of the selector in response to the end of a packet, wherein the packet has a header and a payload, and the payload is encrypted using the CP key and a DES algorithm.

9. The integrated circuit of claim 7, wherein the decryption module decrypts the bus encryption CP key based upon the bus encrypted key and includes a memory element that stores the resulting CP key.

10. The integrated circuit of claim 9, wherein the decryption module receives one of the bus encryption key and the stored resulting CP key in response to the end of a packet, such that decryption module receives a derived bus encryption key when an end of packet is detected and when a new bus encrypted CP key is pending, otherwise, the decryption module decrypts an encrypted payload from the transport stream.

11. The integrated circuit of claim 7, wherein the bus encryption key generator comprises:

a random number generator operative to generate a random number;

a public key generator that generates a public key based upon the random number, the public key to be passed across the unsecured bus;

a public key receiver to receive a second public key from the unsecured bus; and a bus encryption key generator that generates the bus encryption key based upon the random number and the second public key.

12. The integrated circuit of claim 10, wherein the length of the bus encryption key matches a length of the first and second public keys.

13. The integrated circuit of claim 7 wherein the decryptor includes:

a multiple CP key memory element that contains a plurality of decrypted CP keys;

a second selector operatively coupled to select one of the plurality of decrypted CP keys from the multiple CP key memory element; and a third selector operatively coupled to select between a bus encryption key and the selected decrypted CP key.

14. A system for providing a bus-encrypted copy protection (CP) key to an unsecured bus, the system comprising:

a first processor operatively coupled to a second processor via the unsecure bus, having a first bus encryption key generator and a CP key encryptor operatively responsive to a bus encryption key produced by the first bus encryption key generator to produce the bus encrypted copy protection key;

the second processor having a second bus encryption key generator to also produce the bus encryption key; and a decryptor operatively responsive to a bus-encrypted CP key and having a first selector operative to select between a transport stream and the bus-encrypted copy protection key, and operative to decrypt selected encrypted packets based on a decrypted bus-encrypted CP key.

15. The system of claim 14 wherein the first and second processor exchange public keys for each of the first and second bus encryption key generators to each independently produce the bus encryption key.

16. The system of claim 14, wherein the decryptor switches selection of the selector in response to the end of a packet, wherein the packet has a header and a payload, and the payload is encrypted using the CP key and a DES algorithm.

17. The system claim 16, wherein the decryptor decrypts the bus encryption CP key based upon the bus encrypted key and includes a memory element that stores the decrypted bus-encrypted CP key.

18. The system of claim 14, wherein the decryptor receives one of the bus encryption key and the stored decrypted bus-encrypted CP key in response to the end of a packet, such that decryptor receives a derived bus encryption key when an end of packet is detected and when a new bus encrypted CP key is pending, otherwise, the decryptor decrypts an encrypted payload from the transport stream.

* * * * *